Feb. 6, 1934.  F. B. HURT  1,946,461
ROAD BUILDER'S EQUIPMENT
Filed April 15, 1931   4 Sheets-Sheet 1
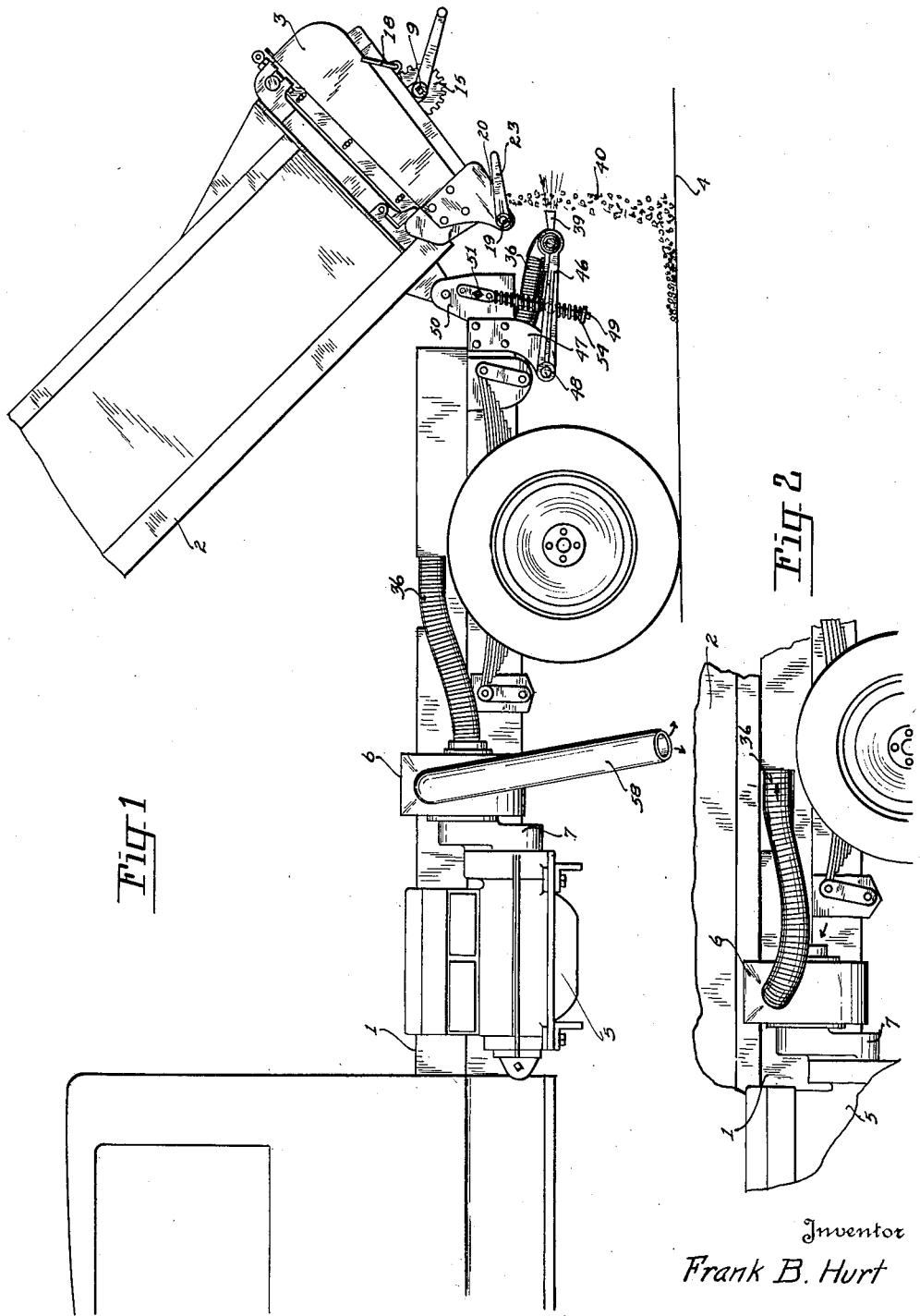
Inventor
Frank B. Hurt
By Thom Bieyu
Attorney

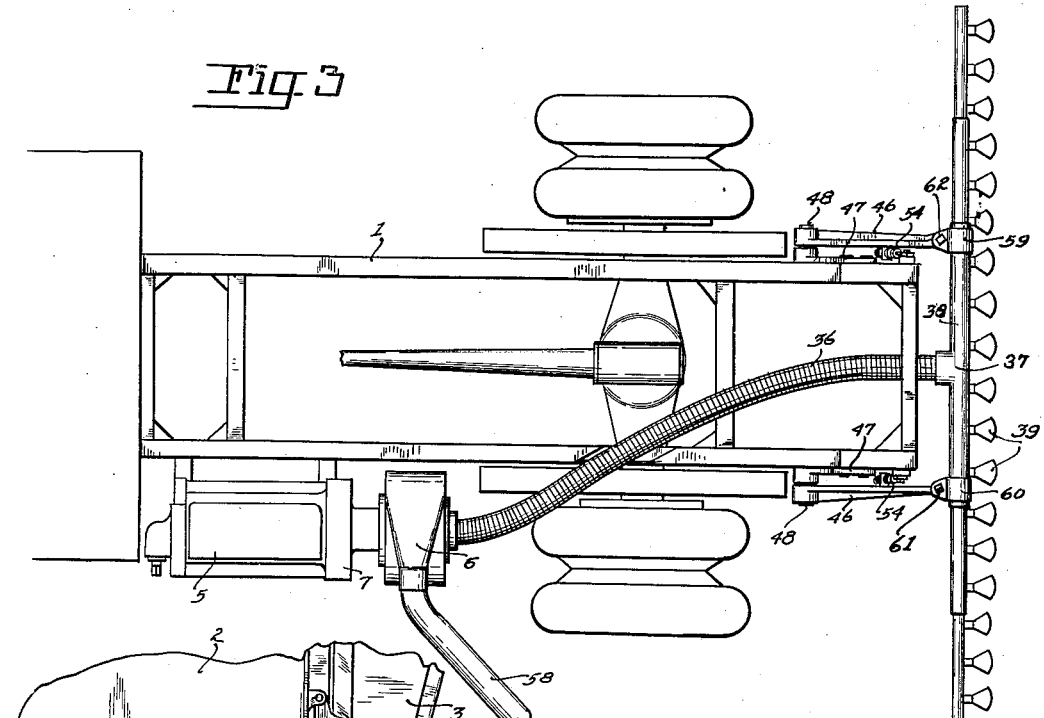
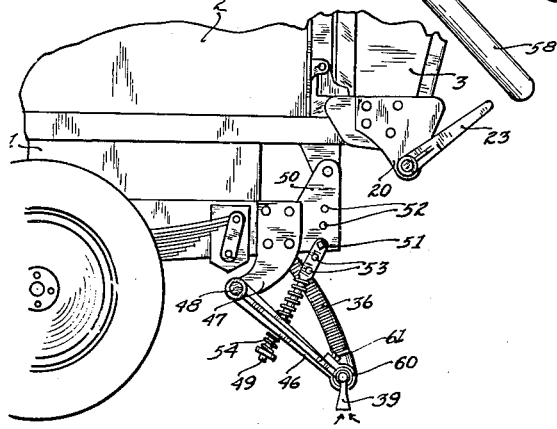

Feb. 6, 1934. F. B. HURT 1,946,461
ROAD BUILDER'S EQUIPMENT
Filed April 15, 1931 4 Sheets-Sheet 3
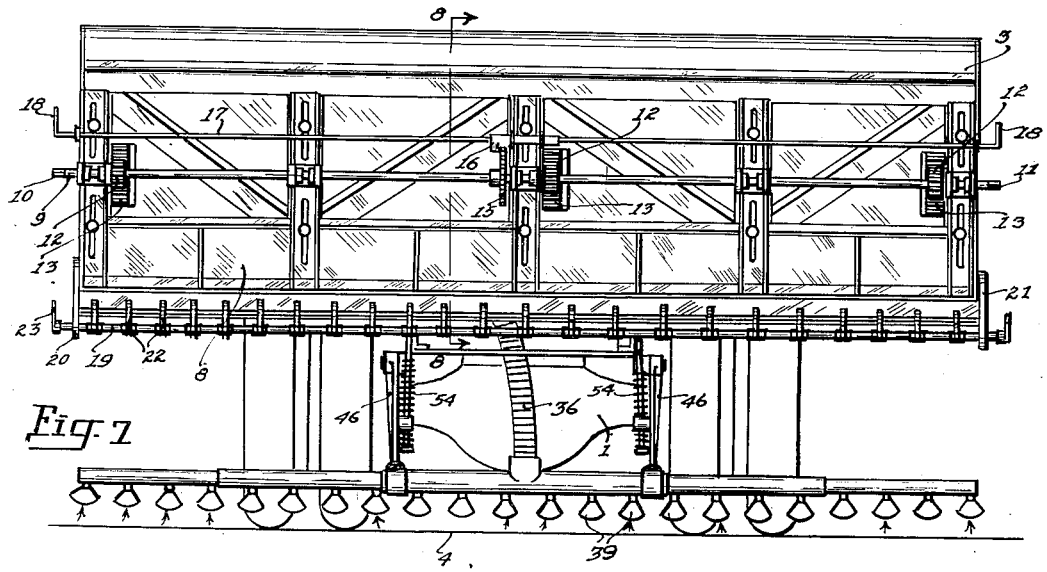
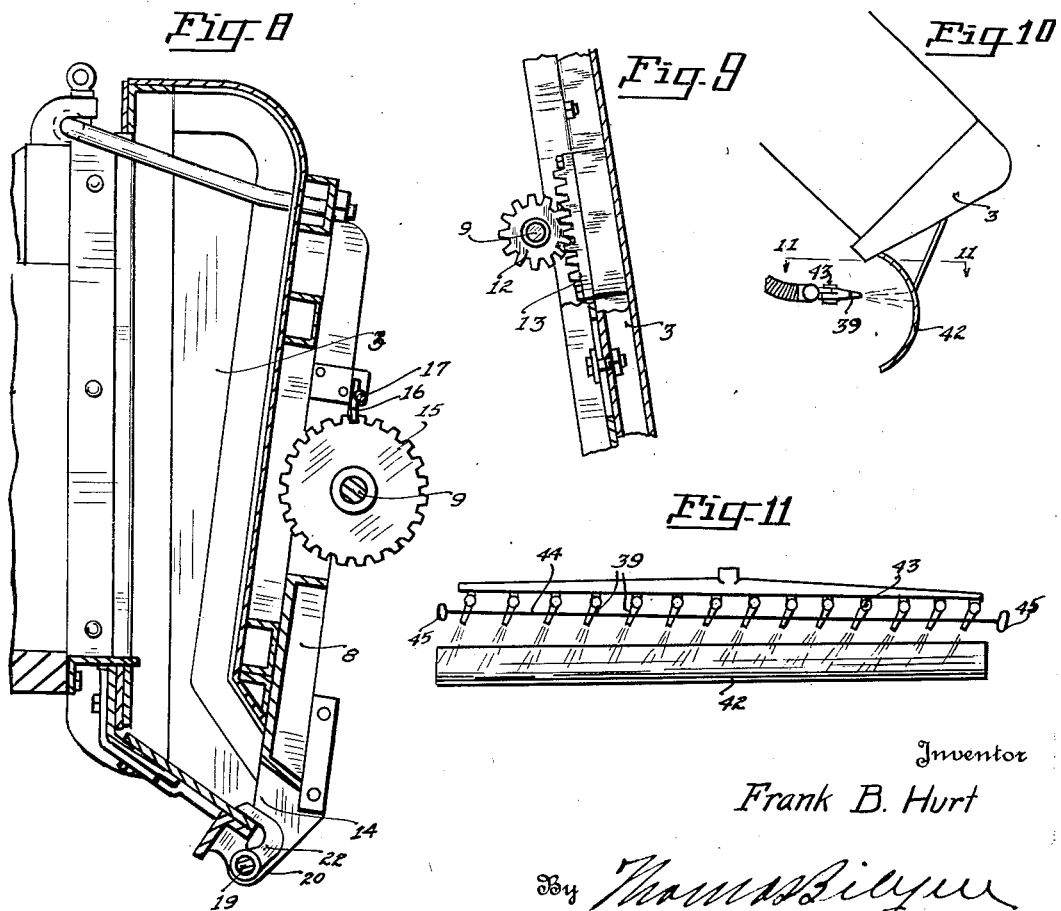
Inventor
Frank B. Hurt

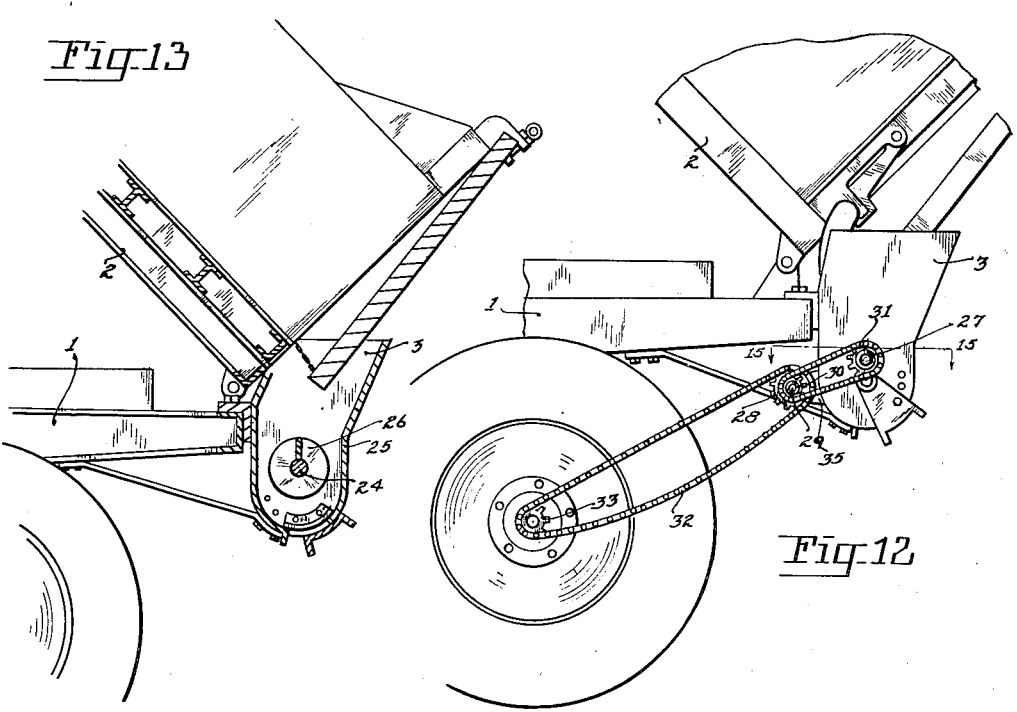
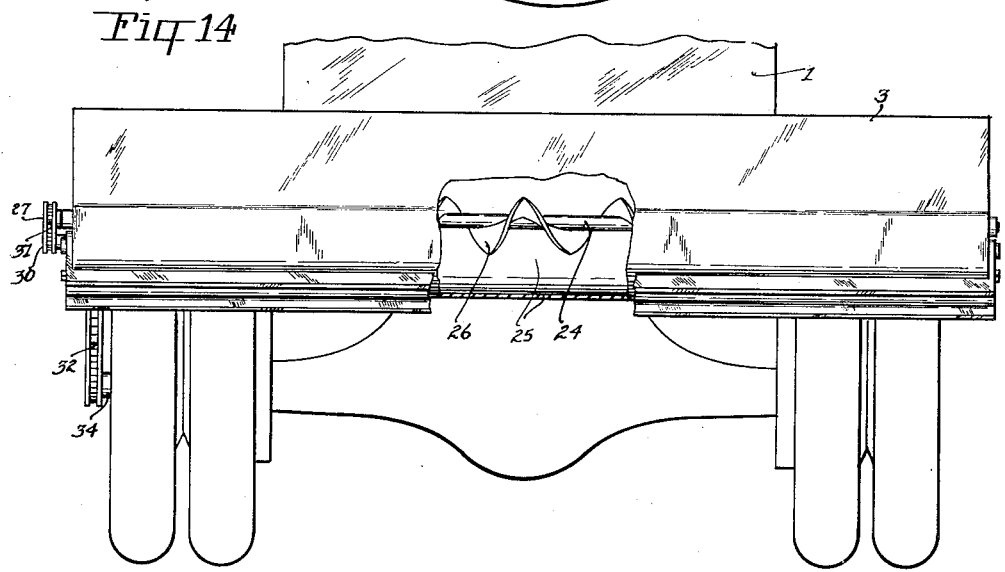
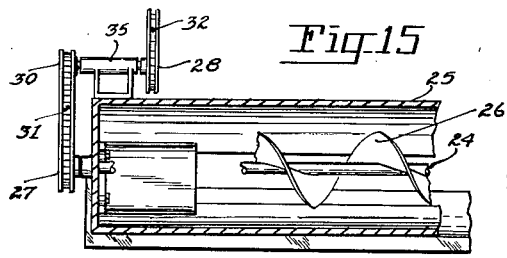

Patented Feb. 6, 1934

1,946,461

UNITED STATES PATENT OFFICE 1,946,461

ROAD BUILDER'S EQUIPMENT

Frank B. Hurt, La Grande, Oreg.

Application April 15, 1931. Serial No. 530,308

20 Claims. (Cl. 94—44)

My invention is intended for use in the constructing of roads, in the preparing of the roadway for the application of the aggregates thereupon and in the placing of the aggregates themselves in a strata of uniform thickness upon the road to be surfaced and to be top dressed.

The invention is primarily intended for use upon a truck.

I place an independent prime mover, as a gas engine, upon the truck and drive a pump unit with the prime mover. A flexible conduit leads from the pumping unit to a head that is adapted for having a pressure, or suction created therein. The head is adapted for being rotated, or partially rotated, about its longitudinal axis. The nozzles are adapted for being moved about their vertical axes to predetermine the direction of flow of the currents emanating therefrom.

A trap is disposed within the flexible conduit for trapping the larger particles picked up when suction is created within the head, to prevent the same passing through the pumping unit.

A tiltable body is mounted upon the truck, having a spreader head associated with the discharge end of the truck body, through which the materials to be spread are fed by gravity.

One of the primary objects of this invention is to provide a device that may be used in the blowing of the dust from the aggregates as the same are spread and to deliver the dust to a dust collector, or at the desired side of the road.

A further object of my invention consists in providing a device that may be used for the blowing of dust particles from the aggregate as the same is deposited upon the binder coat and to remove the dust from the roadway, in advance of the placing of the binder coat upon the roadway.

A still further object of my invention consists in providing a pumping unit driven by an independent prime mover, that is mounted upon a truck that may be used as a suction, or as a pressure pump.

A still further object of my invention consists in providing a device for the purpose intended, that may be used in the elimination of the dust particles from the aggregate being spread, or delivered through the spreader head and that will discharge the same in the direction best suited to the work for which the device is being used.

A still further object of my invention consists in providing a spreader head, the discharge gate of which is disposed upon the outside of the spreader head and which is adapted for being manipulated from the outside of the spreader head box.

And still further objects of my invention consist in providing power driven means for distributing the aggregates to be discharged through the spreader head longitudinally of the spreader head, in order that a uniform stream depth of material may be fed from the spreader head for its entire length of the spreader head.

A further object of my invention consists in providing a spreader head having a blowing head associated therewith, that is adapted for being manually positioned to the desired elevation above the roadway and for being held in a resilient manner in desired, placed position.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a side view of the truck illustrating the truck body raised into tilting position and illustrating the material disposed therein being discharged from the spreader head and illustrating air currents being forced through the stream of aggregates being discharged from the head, to eliminate the dust therefrom.

Fig. 2 is a fragmentary, side view of the truck body and of the pump associated with the prime mover illustrating the pump being used as a suction pump for creating a vacuum in the distributor head.

Fig. 3 is a top, plan view of the truck illustrating the truck body removed therefrom and illustrating the flexible conduit leading from the pumping unit to the air head.

Fig. 4 is a fragmentary, side view of the rear end of the truck illustrating the head being used as a suction head for removing dust particles from the roadway over which the binding agent is to be placed.

Fig. 5 is a fragmentary, sectional, plan view of one of the blower, or suction nozzles secured to the pipe.

Fig. 6 is a sectional side view of trap disposed within the flexible suction line for trapping large particles picked up by the suction, the purpose being to prevent the same passing through the pump.

Fig. 7 is a rear end view of the truck, and the distributor head disposed thereupon illustrating the air head being used for removing dust particles from the roadway over which the binding agent is to be spread.

Fig. 8 is a fragmentary, sectional end view of the mechanism illustrated in Fig. 7, the same being taken on line 8—8 of Fig. 7, looking in the direction indicated.

Fig. 9 is a fragmentary, sectional end view of the end gate assembly illustrating the means for opening and closing the closure gate.

Fig. 10 is a diagrammatical side view, partially in section of the spreader head, illustrating a shield disposed opposite to the nozzles for collecting dust particles removed from the material being cleaned by the air stream passing therethrough, to prevent the dust particles being redistributed over the surface to be coated.

Fig. 11 is a diagrammatical plan view of the air head illustrating means for predetermining the direction of the flow of the air currents emanating from the nozzles, associated with the head.

Fig. 12 is a fragmentary, side view of the spreader head assembly, associated with the discharge end of the truck body illustrating mechanical means for distributing the materials longitudinally of the spreader head.

Fig. 13 is a sectional, side view of the mechanism, illustrated in Fig. 12.

Fig. 14 is a top, plan view, partially in section, of the mechanism illustrated in Figs. 12 and 13. This view is made to particularly illustrate the mechanical means for distributing the aggregates to be discharged from the spreader head, longitudinally of the spreader head.

Fig. 15 is a fragmentary, sectional, plan view of the mechanism, illustrated in Fig. 12, the same being taken on line 15—15 of Fig. 12, looking in the direction indicated.

Like reference characters refer to like parts throughout the several views.

1 is the chassis of the automobile and 2 is a tilting body that is adapted for being raised by the power of the motor truck engine, or by any other suitable means. The material flows from the truck body, by gravity, into a spreader head 3 where the same is delivered upon the roadway 4 to be top dressed. I place a prime mover, as a gas engine 5, upon the chassis of the motor truck and so place the same that it does not interfere with the raising, lowering and the manipulation of the truck body 2. A pump 6 is also secured to the motor truck body and is adapted for being driven through a gear reduction 7 to directly connect the pump with the prime mover. The spreader head is removably secured to the truck body 2. The spreader head is adapted to form the rear end gate of the truck and to be removably secured to the members that support the normal rear end gate of the truck body.

The spreader head is comprised of structural members and has a closure gate 8 that is adapted for being raised and lowered. A shaft 9 runs longitudinally of the spreader head and is adapted to have cranks disposed upon its oppositely disposed ends 10 and 11 to facilitate the manipulation and the opening and closing of the gate of the spreader head. A plurality of pinions 12 is mounted on the shaft 9 and the pinions are adapted to coact with a rack segment 13 secured to the end gate; so that as the shaft 10 is rotated the assembly that is secured to the shaft, which includes the closure plate is raised and lowered to thereby adjust the opening 14 leading from the spreader head to the desired depth. Gear 15 is mounted upon the shaft 9 and a locking pawl 16, is adapted for being manipulated into and out of registry with the gear 15 by a bar 17 that is disposed longitudinally of the spreader head. The bar 17 terminates in hand levers 18 upon its oppositely disposed ends, so that as the end gate is opened by the manipulation, of the crank to the desired depth the same may be locked by the placing in registry the gear 15 and the locking pawl.

An agitator bar 19 runs longitudinally of the spreader head and the same is secured to and mounted upon brackets 20 and 21 that are disposed at the oppositely disposed ends of the spreader head. Spaced fingers 22 are mounted upon the shaft 19 and the shaft is adapted to be rocked by hand lever 23. The purpose of the agitator is to prevent the arching of the aggregates, that would block the discharge outlet leading from the spreader head.

The spreader head is removably secured to the truck assembly and is fixedly positioned thereupon by suitable fastening bolts and rods.

Where an extremely wide strip of top coat is to be applied upon the roadway to be top dressed it may be found necessary to move the aggregates longitudinally of the spreader head to facilitate an even distribution of the aggregates within the spreader head. Where this is found necessary a shaft 24 is disposed longitudinally of the spreader head and in spaced relationship of the walls 25 of the spreader head. A right and left hand screw 26 is disposed upon the shaft 24, having a right hand thread upon one end and a left hand thread upon the oppositely disposed end of the shaft to uniformly feed and distribute the materials longitudinally of the spreader head. This shaft, and screw, is adapted for being driven by the driving assembly as illustrated in Fig. 12 and when so manipulated a sprocket, or other suitable coacting driving element 27 is mounted upon the shaft 24 and an idler sprocket 28 is mounted upon a jack shaft 29. A sprocket 30 is disposed in registerable alignment with the sprocket 27 and a driving element, as a driving chain 31, is trained about the respective aligning sprockets. The jack shaft 29 is driven directly by the driving chain 32 that is trained about the sprocket 28 and a sprocket 33 that is mounted upon the rear axle 34 of the truck. The bracket 35 is mounted relative to the spreader head as illustrated in Fig. 15.

A flexible conduit 36 leads from the pump 6 to a blowing head 38 which may be used as a suction pump for the creating of a vacuum within the head 38. The blower head is reduced in cross sectional area as the distance from the port 37 is increased, to maintain a pressure at the extremities of the head 38, and to deliver a uniform pressure at the nozzles, 39.

The blowing head has a plurality of nozzles 39 spaced apart and disposed in alignment upon its discharge side.

The purpose of the nozzles is to blow air, in substantial velocity through the stream of aggregates 40, being delivered from the spreader and disposed upon the roadway 4; to eliminate the finely comminuted dust particles from the aggregate being delivered on the roadway. Where it is desired to confine the dust and to discharge the same from one, or the other of the sides of the truck, a shield 42 is placed in registry with the air blast, as illustrated in Figs. 10 and 11. The nozzles 39 are also rockably disposed about vertical axes 43. A hand manipulative rod 44 is secured to each of the nozzles and the rod is adapted for being manipulated at either end by a hand engaging end 45. The manipulation of the hand manipulative rod 44 positions the nozzles to blow the air against the shield, and to predetermine the direction of the blast along the shield, in order that the dust may be blown from the desired side of the truck depending upon the direction in which the nozzles 39 are positioned.

It is also necessary to raise and lower the blower head assembly to blow, or suck, at the required elevation, above the roadway through the blowing head, or suction head. The head 38 is supported upon a pair of coacting arms 46 that are positioned at the oppositely disposed sides of the truck. The arms are hingedly supported upon brackets 47. The arms 46 are rockably disposed about journal pins 48. Arms 46 are resiliently supported upon the rod 49. The rod 49 is adapted for being positioned relation to the supporting bracket 50 by the placing of a stud, or bolt 51 through the rod 49 and securing the same in the holes 52 that are disposed within the bracket 50 and within the spaced holes in the rod 49. Spaced holes 53 are also disposed within the rod 49 to give added adjustment to the associated elements. A reacting element 54 is mounted upon the rod and connects the rod with the arms to give resiliency to the assembly.

In the laying of pavement, where a binding agent is placed upon the bed of the roadway, it is quite customary to run a power driven sweeper over the roadway and to thereby sweep foreign matter from the roadway, but it is very difficult to eliminate the fine dust from the roadway.

I create a vacuum within the head 38 and place the nozzles in close proximity with the surface to be coated, at which time the dust particles are sucked from the roadway and a relatively clean roadway is the result, upon which the binder coat may be placed.

In order to protect the pumping unit I place a trap 55 in the suction line and hinge a counterweighted bottom 56 to the bottom of the trap, so that the heavy articles being drawn through the suction line are deposited within the trap.

When a sufficient amount of material has been trapped within the trap 55 the counterweight 57 and the pressure upon the closure 56 is overcome and the materials trapped therein, are freed automatically from the trap by the action of gravity.

Where the pumping unit is to be used for the dual purpose of creating suction and pressure, at different times, the discharge 58 and the discharge line 36 may be made interchangeable to create suction, or pressure depending upon the purpose for which the device is to be used. The discharge 58 should be made relatively light to facilitate the positioning of the same to desired placement and the same should have a sufficient number of joints made integral therewith for positioning the same when desired to blow the dust and deliver the same to the side of the road and at the desired and precise position.

A relatively large dust collector not here shown may be placed at the end of the truck, into which the material may be blown. The frame work of the dust collector may be made of light material and covered by a suitable covering to prevent the dissipation of the dust freely into the air and to collect the same.

The head 38 is held within the arms by frictional bands 59 and 60. The friction is developed through the action of bolts 61 and 62, illustrated in Fig. 3. The desired elevation of the nozzles may be controlled by the rotation of the head within the frictional bands 59 and 60. When the desired position of the nozzles is obtained the head is locked relative to the arms by the tightening of the bolts 61 and 62.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a truck, a body mounted upon the truck that is adapted for having the materials emptied therefrom by gravity, a spreader head disposed at the discharge point and adapted for having the materials passed therethrough from the truck body, mechanical means for transferring the materials longitudinally of the spreader head for predetermining the depth of the stream of materials that may be permitted to flow from the spreader head, air means for removing the dust from the materials after being discharged from the spreader head, and means for conducting the removed dust to one side of the truck and means for collecting the dust in a dust collector.

2. In a device of the class described, the combination of a truck, an aggregate carrying body mounted upon the truck, a spreader head disposed at the discharge end of the truck body, means for uniformly distributing the aggregates longitudinally of the spreader head, settable means for forming a discharge outlet of predetermined depth disposed longitudinally of the spreader head, means for removing dust and small comminuted particles from the aggregate by air currents, means for developing the air currents for removing the dust and comminuted particles and means for collecting the dust and comminuted particles when removed.

3. In a device of the class described, the combination of a truck, a truck body carrying a spreader head tiltably mounted upon the truck, settable means for creating a discharge outlet of desired depth disposed longitudinally of the spreader head, means for creating an air, or suction blast disposed upon the truck, means for directing the air current, or the suction current through the aggregates after being discharged from the spreader head, and means for controlling the direction of deposit of any comminuted particles that may be picked up by the blast.

4. In a device of the class described, the combination of a truck, a truck body and a spreader head, means for conducting aggregates from the truck body through the spreader head, means for predetermining the depth of stream permitted to flow from the spreader head and means for removing dust particles from the aggregate as discharged and for predetermining the point of discharge of the removed dust particles.

5. In a device of the class described, the combination of a truck, a truck body and spreader head coacting with each other to release aggregates from the truck body through the spreader head in a stream of predeterminable depth, and means for removing particles of finely comminuted materials from the aggregate after delivery from the spreader head and for delivering the dust at either side of the roadway.

6. In a device of the class described, the combination of a truck, a truck body and a spreader head, the spreader head being of a greater length than the width of the truck body, the spreader head being so shaped as to build up a breast of material within the spreader head so that the material will flow by gravity to the full length of the spreader head until the contents of the aggregate disposed within the truck body and the spreader head has been discharged.

7. In a device of the class described, the combination of a truck body tiltable to discharge its contents from the low end by gravity, a spreader head forming the rear end gate of the truck body, means for distributing the materials being discharged longitudinally of the spreader head, means for aerating the materials after discharge from the spreader head and before the same reaches the ground, means for predetermining the height from the ground that the aerating will occur, and means for predetermining the direction of flow of the aerating currents.

8. In a device of the class described, in combination with a tiltable truck body, of a spreader head associated with the discharge end of the truck body, means for aerating the aggregates after being discharged from the spreader head and means for predetermining the point of aeration and for predetermining the direction of the flow of the aerating currents.

9. In a device of the class described, in combination with a tiltable truck body, a spreader head through which materials are fed, selective means for feeding the materials longitudinally of the spreader head and means for aerating the materials and for predetermining the elevation at which the aerating is to occur and the direction of flow of the aerating currents.

10. In a device of the class described, the combination of a portable power driven vehicle, a tiltable body mounted upon the vehicle, a spreader head removably mounted upon the fixed end of the body and adapted for forming the end gate of the body, an independent power plant mounted upon the vehicle, a pump mounted upon the vehicle and adapted for being driven by the independent power plant, a blower head mounted upon the vehicle and adapted to receive the resultant products of the pumping unit, nozzles associated with the blower head and means for raising, lowering and partially rotating the blower head, and means for altering the alignment of the nozzles relative to the longitudinal axis of the blower head.

11. In a device of the class described, the combination of a motor truck, an independent power plant and pump disposed upon the chassis of the truck, a suction and blower head associated with the pump, nozzles associated with the suction blower head, means for fixedly positioning the suction blower head about horizontal axes and means for positioning the nozzles relative to the suction blower head.

12. In a device of the class described, the combination of a truck having a tiltable body, an aggregate spreader head disposed at the discharge end of the truck, means for removing the finely comminuted particles from the aggregate after being discharged from the spreader head by suction and automatic means for eliminating the larger particles picked up by the suction from the suction pipe.

13. In a device of the class described, in combination with a truck having a tiltable body, of a spreader head disposed at the discharge end of the truck body and adapted for forming the rear end gate of the truck, independent power means mounted upon the truck and adapted for creating an air blast, a discharge head for the air blast, a plurality of spaced nozzles disposed upon one side of the air blast head, and settable means for predetermining the direction of flow of the air blast and for raising and lowering the air blast head.

14. In a device of the class described, the combination of a motor truck, a tiltable body mounted upon the truck, a spreader head forming the rear end gate of the truck body, an independent pumping unit adapted for being used as a pressure, or a suction pump mounted upon the truck, means for blowing or sucking the dust particles from the materials being discharged from the spreader head, and means for predetermining the direction of the blast that effects the removal.

15. In a device of the class described, the combination of a motor truck, a tiltable body mounted upon the truck, a spreader head associated with the rear end of the truck body, means for removing dust particles from the materials passing through the spreader head, at different elevations, and means for predetermining the side of the truck that the dust particles will be discharged from.

16. In a device for laying dust free aggregate upon a road, the combination of a truck body, a spreader head removably secured thereto, means for securing a uniform distribution of the aggregate over the width of the spreader head, means for pneumatically cleaning the aggregate from dust and other finely comminuted particles, and for removing dust particles from a prepared road bed by suction.

17. In a device of the class described, the combination with an automotive truck body, of a removable spreader head, pneumatic means for cleaning aggregate to be deposited upon the road and a screw feeding device for securing the even distribution of the aggregate over the full width of the spreader head.

18. In a device of the class described the combination of a truck body, a spreader head associated therewith, a motor driven air pump, an air distributing head of diameter constantly decreasing from center to ends, nozzles pivotally attached to the distributing head along its length, and a pipe connecting the distributing head to the pump, and means for simultaneously directing all the nozzles in any desired direction.

19. In a device of the class described, the combination of a truck body, a reversible motor driven air pump, a distributing head of circular cross section disposed transversely of the truck body and having its diameter continually decreasing from the center to the outer ends, a flexible pipe connecting the distributing head to the pump, nozzles disposed along the entire length of the distributing head, means for adjustably positioning the distributing head relative to the road, said nozzles being adapted both to the cleaning of surface dust from the road bed by suction and to the cleaning of finely comminuted particles, by blowing, from the aggregate while the same is being deposited upon the road bed.

20. In a device of the class described, the combination with a vacuum cleaning mechanism, of a trap for large particles of matter, said trap composed of a body element having an open bottom, a hinged plate adapted to close said opening, a counterweight and spring adapted to maintain the closure between the said plate and the body element, and means for predetermining the pressure upon the closure plate necessary to cause it to open and allow the discharge of material caught within the trap.

FRANK B. HURT.